United States Patent
Kanzaki (10) Patent No.: US 11,773,906 B2
(45) Date of Patent: Oct. 3, 2023

(54) SEALING DEVICE AND SEALING STRUCTURE

(71) Applicant: NOK CORPORATION, Tokyo (JP)

(72) Inventor: Go Kanzaki, Fukushima (JP)

(73) Assignee: NOK CORPORATION, Tokyo (JP)

( * ) Notice: Subject to any disclaimer, the term of this patent is extended or adjusted under 35 U.S.C. 154(b) by 42 days.

(21) Appl. No.: 17/623,314

(22) PCT Filed: May 14, 2020

(86) PCT No.: PCT/JP2020/019172
§ 371 (c)(1),
(2) Date: Dec. 28, 2021

(87) PCT Pub. No.: WO2021/005882
PCT Pub. Date: Jan. 14, 2021

(65) Prior Publication Data
US 2022/0356909 A1    Nov. 10, 2022

(30) Foreign Application Priority Data

Jul. 10, 2019 (JP) .................................. 2019-128314

(51) Int. Cl.
*F16C 33/80* (2006.01)
*F16C 19/18* (2006.01)
*F16C 33/78* (2006.01)

(52) U.S. Cl.
CPC .......... *F16C 33/805* (2013.01); *F16C 19/186* (2013.01); *F16C 33/783* (2013.01); *F16C 33/7886* (2013.01); *F16C 2326/02* (2013.01)

(58) Field of Classification Search
CPC ........ F16C 33/00; F16C 33/80; F16C 33/805; F16C 33/7816; F16C 33/782;
(Continued)

(56) References Cited

U.S. PATENT DOCUMENTS

| | | | | |
|---|---|---|---|---|
| 4,040,683 A | * | 8/1977 | Korenhof | .............. F16C 19/187 384/482 |
| 4,402,558 A | * | 9/1983 | Olschewski | ........ B60B 27/0005 384/473 |
| 8,231,129 B2 | * | 7/2012 | Kobayashi | .......... F16C 33/7876 277/346 |

FOREIGN PATENT DOCUMENTS

| | | |
|---|---|---|
| DE | 7434724 U | 1/1975 |
| DE | 202017100447 U1 | 5/2017 |

(Continued)

OTHER PUBLICATIONS

International Search Report issued in International Bureau of WIPO Patent Application No. PCT/JP2020/019172, dated Jul. 28, 2020.

(Continued)

*Primary Examiner* — Nathan Cumar
(74) *Attorney, Agent, or Firm* — GREENBLUM & BERNSTEIN, P.L.C.

(57) ABSTRACT

A sealing device for sealing a gap between inner and outer members includes a mounted part attached to a cylindrical end of the outer member; at least one lip disposed radial inside the mounted part and extending toward the inner member; an annular part covering an end surface of the end of the outer member; and an annular flange formed from an elastic material connected to the annular part and disposed radial outside the end of the outer member. The inner member includes an inner portion disposed radial inside the outer member; a flange extending radially outward from the inner portion; and a through-hole formed in the flange for inserting a screw for securing the inner member to another member. The outer edge of the flange of the sealing device is disposed radial outside a portion of the through-hole that is the closest to the central axis.

2 Claims, 9 Drawing Sheets

(58) Field of Classification Search
CPC .............. F16C 33/7823; F16C 33/7886; F16C 33/7889; F16C 19/00; F16C 19/186; F16C 19/187; F16C 2326/00; F16C 2326/02
USPC ........................................................ 277/346
See application file for complete search history.

(56) References Cited

FOREIGN PATENT DOCUMENTS

| | | |
|---|---|---|
| DE | 102016125118 A1 | 6/2018 |
| EP | 2 184 519 | 1/2013 |
| JP | 2008-281013 | 11/2008 |
| JP | 2017-133578 | 8/2017 |
| JP | 2017133578 A * | 8/2017 ............. B60B 27/00 |

OTHER PUBLICATIONS

Notice of Reasons for Refusal received in JP Application No. 2021-530506, dated Oct. 11, 2022.
Japan Official Action issued in JP Application No. 2021-530506, dated Jan. 10, 2023.
Extended European Search Report issued in European Patent Application No. 20836822.5 dated Jul. 15, 2022.

* cited by examiner

SEALING DEVICE AND SEALING STRUCTURE

TECHNICAL FIELD

The present invention relates to sealing devices and sealing structures.

BACKGROUND ART

Rolling bearings, such as ball bearings, are well known and are used, for example, in hubs of automotive vehicles. A sealing device for sealing the inside of a rolling bearing is disclosed in Patent Document 1. The sealing device includes an annular body fixed to the outer race of the rolling bearing, a radial lip extending radially inward from the annular body, and multiple side lips extending laterally from the annular body. The radial lip is in contact with the outer peripheral surface of the inner race of the bearing or the outer peripheral surface of a part fixed to the inner race, and has a function of sealing lubricant inside the bearing, whereas the side lips extend to a flange of the inner race, and have a function of sealing, so that foreign matter, such as water and dust, does not enter into the inside of the bearing from the outside.

BACKGROUND DOCUMENT(S)

Patent Document(s)

Patent Document 1: JP-A-2008-281013

SUMMARY OF THE INVENTION

For this type of sealing device, there is a demand to improve the function of protecting against water (including muddy water or salt water) from entering the inside of the sealed object (e.g., bearing) if the sealing device is used in an environment with a lot of water. To minimize ingress of foreign matter, a foreign-matter-ingress reducing portion may be added to the sealing device. However, there may be space constraints in the structure to which the sealing device is attached. For example, hub bolts are provided in hubs of automotive vehicles for mounting wheels, and it has been believed that the hub bolts limit the size and/or placement of the foreign-matter-ingress reducing portion.

Accordingly, the present invention provides a sealing device and sealing structure that has a large foreign-matter-ingress reducing portion, even though there are space limitations in the structure to which the sealing device is attached.

In accordance with an aspect of the present invention, there is provided a sealing device adapted to be located between an inner member and an outer member that rotate relative to each other, for sealing a gap between the inner member and the outer member, the sealing device including a mounted part including a central axis and adapted to be attached to a cylindrical end portion of the outer member; at least one lip disposed radial inside the mounted part and adapted to extend toward the inner member; an annular part covering an end surface of the end portion of the outer member; and an annular flange formed from an elastic material connected to the annular part and disposed radial outside the end portion of the outer member. The inner member includes an inner portion disposed radial inside the outer member; a flange extending radially outward from the inner portion; and a through-hole formed in the flange into which a screw for securing the inner member to another member is inserted. An outer edge of the flange of the sealing device is disposed radial outside a portion of the through-hole that is the closest to the central axis.

In this aspect, the annular flange of the sealing device is connected to the annular part covering the end surface of the end portion of the outer member and encircles the end portion of the outer member. Thus, the flange serves as a foreign-matter-ingress reducing portion that restricts foreign matter from entering over a large area. In the inner member, a through-hole is formed into which a screw for fixing the inner member to another member is inserted. The outer edge of the flange of the sealing device is located radial outside the portion of the through-hole that is the closest to the central axis, and the flange has a large dimension. Therefore, when the screw is inserted into the through-hole, the screw is passed through the range of the flange of the sealing device. Since the flange of the sealing device is formed from an elastic material, when inserting the screw into the through-hole, the flange can be elastically deformed to facilitate passage of the screw over the flange. After the screw has been in place, the flange is returned to the initial shape thereof and prevents the ingress of foreign matter over a large area. Thus, even though there is a space limitation in the structure, the sealing device having the flange as a foreign-matter-ingress reducing portion having a large area can be utilized.

Preferably, a distance between the outer edge and an inner edge of the flange of the sealing device is less than a distance between the inner edge and the portion of the through-hole that is the closest to the central axis.

In this case, when the screw is inserted into the through-hole, the flange of the sealing device is prevented from being caught between the head of the screw and the flange of the inner member, and the screw can pass over the flange smoothly.

In accordance with an aspect of the present invention, there is provided a sealing structure including an inner member; an outer member rotating relative to the inner member; and a sealing device located between the inner member and the outer member for sealing a gap between the inner member and the outer member. The sealing device includes a mounted part including a central axis and adapted to be attached to a cylindrical end portion of the outer member; at least one lip disposed radial inside the mounted part and adapted to extend toward the inner member; an annular part covering an end surface of the end portion of the outer member; and an annular flange formed from an elastic material connected to the annular part and disposed radial outside the end portion of the outer member. The inner member includes an inner portion disposed radial inside the outer member; a flange extending radially outward from the inner portion; and a through-hole formed in the flange of the inner member into which a screw for securing the inner member to another member is inserted. An outer edge of the flange of the sealing device is disposed radial outside a portion of the through-hole that is the closest to the central axis.

Preferably, a distance between the outer edge and an inner edge of the flange of the sealing device is less than a distance between the inner edge and the portion of the through-hole that is the closest to the central axis.

DESCRIPTION OF EMBODIMENTS

Hereinafter, with reference to the accompanying drawings, various embodiments according to the present invention will be described. It is of note that the drawings are not necessarily to scale, and certain features may be exaggerated or omitted.

Figure 1:
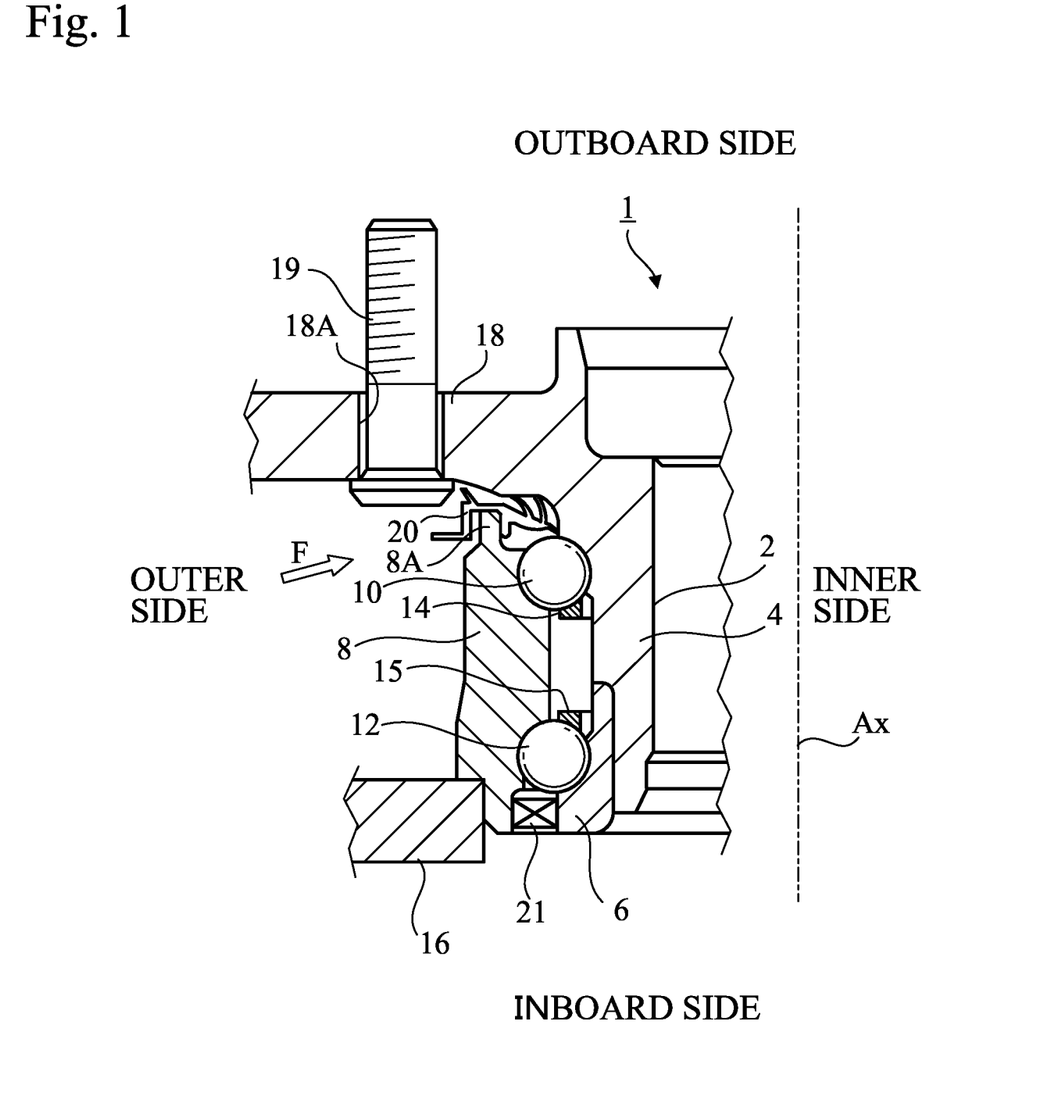
FIG. 1 is a partial cross-sectional view of an example of a rolling bearing in which a sealing device according to an embodiment of the present invention is used.

FIG. 1 shows a hub bearing for an automotive vehicle, which is an example of a rolling bearing, in which a sealing device according to an embodiment of the present invention is used. However, the use of the present invention is not limited to hub bearings, and the present invention can also be applied to other rolling bearings. In the following description, the hub bearing is a ball bearing. However, the use of the present invention is not limited to ball bearings, and the present invention can also be applied to other rolling bearings, such as roller bearings and needle bearings, having other types of rolling elements. The present invention is also applicable to rolling bearings used in machines other than automotive vehicles.

The hub bearing 1 includes a hub (inner member) 4 having a hole 2 into which a spindle (not shown) is inserted, an inner race (inner member) 6 attached to the hub 4, an outer race (outer member) 8 located outside of the hub 4 and the inner race 6, a plurality of balls 10 arranged in a row between the hub 4 and the outer race 8, a plurality of balls 12 arranged in a row between the inner race 6 and the outer race 8, and a plurality of retainers 14 and 15 for retaining the balls in place.

Whereas the outer race 8 is stationary, the hub 4 and the inner race 6 rotate as the spindle rotates.

The common central axis Ax of the spindle and hub bearing 1 extends in the vertical direction in FIG. 1. In FIG. 1, only the left part with respect to the central axis Ax is shown. Although not shown in detail, the upper side of FIG. 1 is the outer side (outboard side) of the automotive vehicle on which the wheels are arranged, whereas the lower side is the inner side (inboard side) on which the differential gears are arranged. The outer side and the inner side shown in FIG. 1 mean the outer side and the inner side in radial directions, respectively.

The outer race 8 of the hub bearing 1 is fixed to the hub knuckle 16. The hub 4 has an inner portion located radial inside the outer race 8 and an outboard side flange 18 extending from the inner portion radially outward further than the outer race 8

A wheel can be attached to the outboard flange 18 by multiple hub bolts (screws) 19. Multiple through-holes 18A through which the hub bolts are inserted are formed in the outboard flange 18. The through-holes 18A are spaced apart from one another in a circumferential direction.

A sealing device 20 that seals the gap between the outer race 8 and the hub 4 is located near the end of the outer race 8 on the outboard side, and inside the end of the outer race 8 on the inboard side. Another sealing device 21 that seals the gap between the outer race 8 and the inner race 6 is located inside the end of the inner side of the outer race 8. The function of the sealing devices 20 and 21 prevents the grease, that is, the lubricant, from flowing out from the inside of the hub bearing 1 and prevents foreign matter (water, including muddy water or salt water) from entering the inside of the hub bearing 1 from the outside. In FIG. 1, an arrow F indicates an example of the direction of foreign matter flow from the outside.

The sealing device 20 is located between the rotating hub 4 of the hub bearing 1 and the stationary outer race 8 to seal the gap between the hub 4 and the outer race 8.

Figure 2:
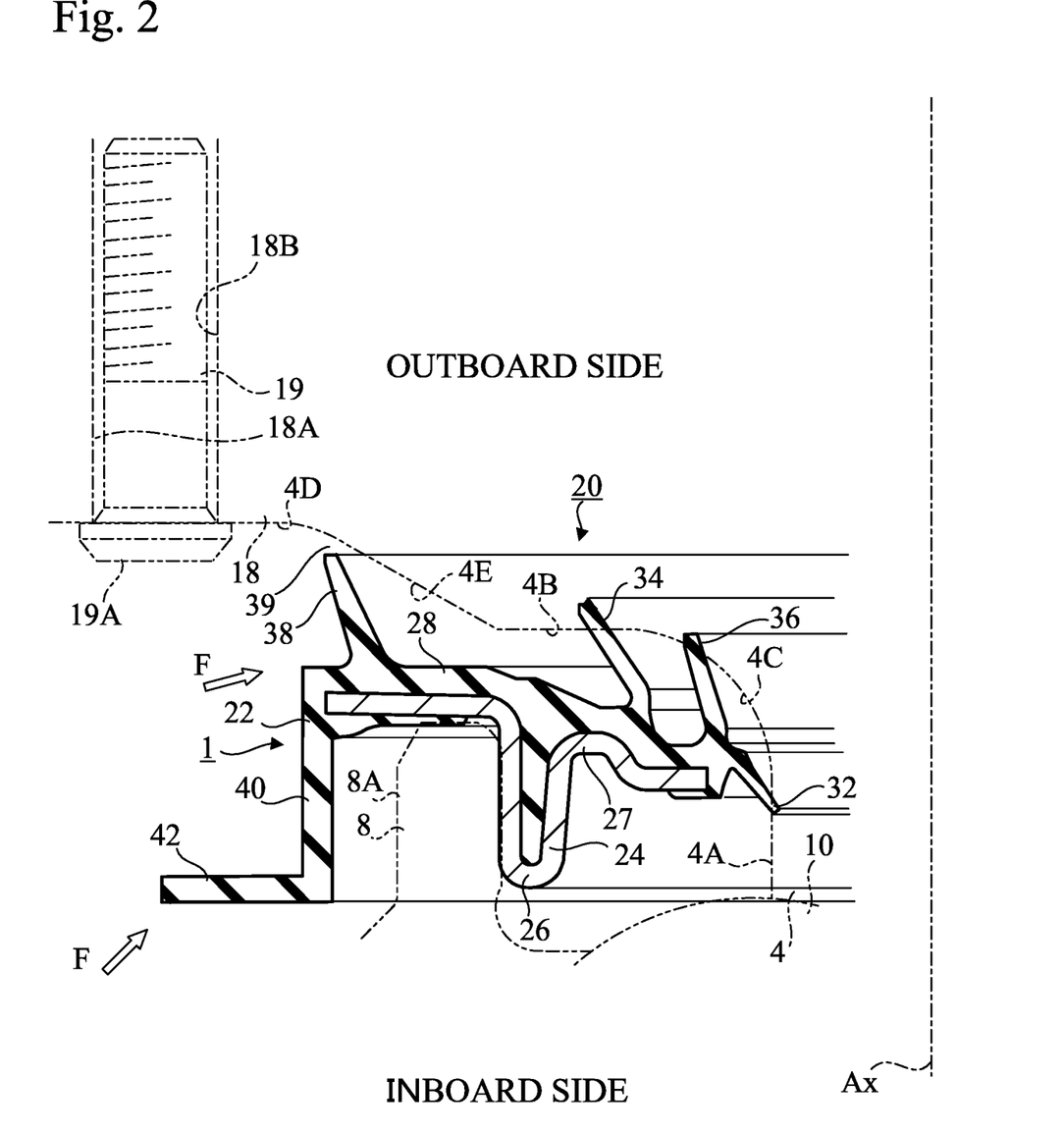
FIG. 2 is a partial cross-sectional view of the sealing device according to the embodiment of the present invention.

As shown in FIG. 2, the sealing device 20 is located inside a space surrounded by a cylindrical end portion 8A on the outboard side of the outer race 8 of the hub bearing 1, the outer peripheral surface 4A of a cylindrical part, in the vicinity of the balls 10, of the hub 4 of the hub bearing 1, a flange surface 4B of the hub 4 extending further outward than the outer peripheral surface 4A, and an arc surface 4C connecting the outer peripheral surface 4A and the flange surface 4B. The flange surface 4B is a surface on the inboard side of the outboard side flange 18. Although the sealing device 20 is annular, only the left part is shown in FIG. 2.

The outboard side flange 18 of the hub 4 further has a flange surface 4D that is more concave than the flange surface 4B and an inclined surface 4E that connects the flange surfaces 4B and 4D.

In FIG. 2, the hub 4 and the outer race 8 are indicated by phantom lines. Although portions of the sealing device 20 that are in contact with the hub 4 and the outer race 8 deform by the contact, FIG. 2 shows the outline of the sealing device 20 when it is not in use.

Figure 3:
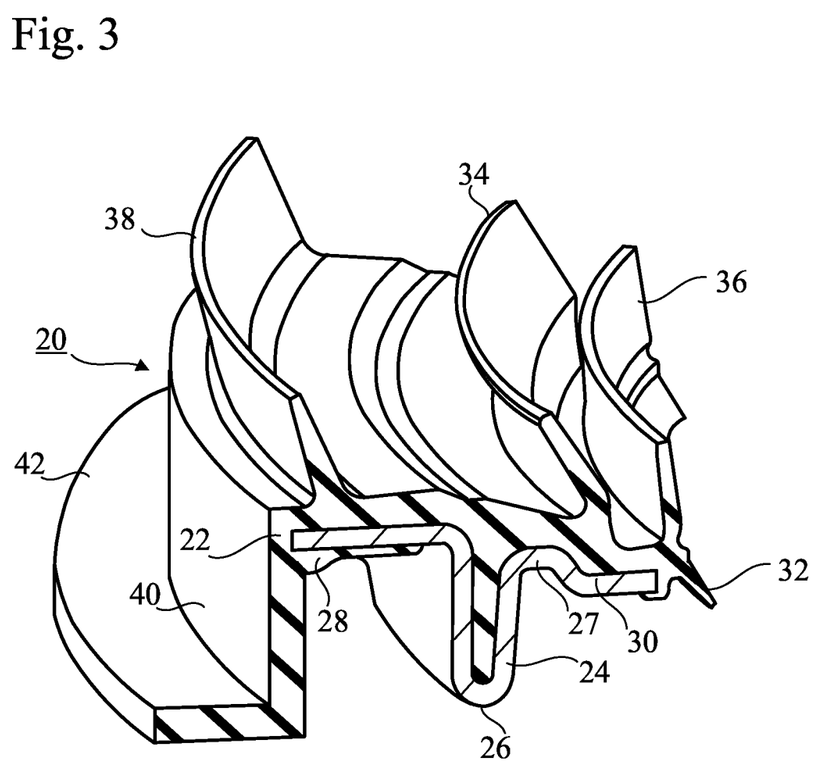
FIG. 3 is a perspective view of the sealing device according to the embodiment in which a part is cutaway.

As shown in FIGS. 2 and 3, the sealing device 20 includes an elastic ring 22 formed from an elastic material, for example, an elastomer, and a reinforcing ring 24 formed from a rigid material, for example, a metal. The reinforcing ring 24 is partly embedded in the elastic ring 22 and adheres to the elastic ring 22.

The sealing device 20 includes an inner tubular part 26, an inner annular part 27, an outer annular part 28, a radial lip 32, two side lips 34 and 36, an auxiliary lip 38, an outer tubular part 40, and a flange 42.

The inner tubular part (mounted part) 26 is a cylindrical part centered on the central axis Ax (see FIGS. 1 and 2) and attached to the cylindrical end portion 8A of the outer race 8. The inner tubular part 26 is fixed to the end portion 8A. The fixing scheme is not limited, and it may be, for example, an interference fit (press fit). The inner tubular part 26 is constituted of tubular portions in which the reinforcing ring 24 is folded and an elastic ring 22 filled in these tubular portions. The outer tubular portion of the tubular portions in which the reinforcing ring 24 is folded has the outer peripheral surface of the inner tubular part 26 that is in close contact with the inner peripheral surface of the end portion 8A by the interference fit.

The inner annular part 27 extends radially inward from the inner tubular part 26 and is located radial inside the end portion 8A of the outer race 8. In this embodiment, the inner annular part 27 extends obliquely from the inner tubular part 26 radially inward and toward the inboard side. The inner annular part 27 is also constituted of the elastic ring 22 and the reinforcing ring 24.

The radial lip 32 and the side lips 34 and 36 are made from only an elastic material and are thin plate circular rings extending from a portion of the inner annular part 27 corresponding to the elastic ring 22, and their respective distal ends are in contact with the hub 4. Whereas the sealing device 20 is mounted on the stationary outer race 8, the hub 4 rotates, so that the lips 32, 34, and 36 slide on the hub 4.

The radial lip 32 extends obliquely (radially inward and toward the inboard side) from the innermost edge of inner annular part 27, and the distal end of the radial lip 32 is in contact with the outer peripheral surface 4A of the hub 4 in the vicinity of balls 10. The radial lip 32 extends radially inward and toward the inboard side, and plays a main role of preventing the lubricant from flowing out from the hub bearing 1.

The side lips 34 and 36 extend from the inner annular part 27 laterally (to the outboard side) and radially outward. The distal end of the side lip 34 is contact with the flange surface 4B of the hub 4, whereas the distal end of the side lip 36 is contact with the arc surface 4C. The side lips 34 and 36 play a main role of preventing foreign matter from flowing into the hub bearing 1 from the outside. The side lip 36 has a backup function that blocks foreign matter that has flowed through the side lip 34. Since the side lip 36 exists between the radial lip 32 and the side lip 34, it can also be called an intermediate lip.

FIG. 2 shows the radial lip 32 and the side lips 34 and 36 when the sealing device 20 is not deployed in the hub bearing 1. At this time, the radial lip 32 and the side lips 34 and 36 are not subjected to external force. However, when the sealing device 20 is deployed in the hub bearing 1, these lips are in contact with the hub 4 and are deformed by receiving reaction forces.

The outer annular part 28 extends radially outward from the tubular part 26 and is substantially orthogonal to the central axis Ax of the hub bearing 1. The outer annular part 28 is also constituted of the elastic ring 22 and the reinforcing ring 24, and the reinforcing ring 24 is embedded in the elastic ring 22. In the outer annular part 28, the elastic ring 22 faces, and is in contact with the end surface of the cylindrical end portion 8A of the outer race 8.

The auxiliary lip 38 is made from only an elastic material, and it is a thin plate circular ring extending from the outer annular part 28. The auxiliary lip 38 is located radially outside the inner tubular part 26 and extends radially outward and toward outboard side (toward the flange surface 4D of the outboard side flange 18 of the hub 4). The auxiliary lip 38 deflects foreign matter coming from the outside and can minimize foreign matter reaching the side lip 34.

In this embodiment, the auxiliary lip 38 is not in contact with the outboard side flange 18, so that an annular and labyrinth-shaped clearance 39 is provided between the distal end of the auxiliary lip 38 and the flange surface 4D. However, the auxiliary lip 38 may be in contact with, and slide on, the flange surface 4D. The auxiliary lip 38 is not absolutely necessary.

The outer tubular part 40 is a cylindrical part extending from the outer end of the outer annular part 28 toward the inboard side and centered on the central axis Ax. The outer tubular part 40 surrounds the cylindrical end portion 8A of the outer race 8. An annular gap is provided between the outer tubular part 40 and the end portion 8A.

In this embodiment, the outer tubular part 40 is made from only an elastic material. However, the outer tubular part 40 may be formed of the elastic ring 22 and the reinforcing ring 24.

In this embodiment, the outer tubular part 40 is cylindrical, but may be truncated cone shaped.

The flange 42 extends radially outward from the inboard side edge of the outer tubular part 40. The flange 42 is a circular annular part centered on the central axis Ax. The flange 42 is connected to the outer annular part 28 by the outer tubular part 40 and is located radial outside the end portion 8A of the outer race 8. The outer edge of the flange 42 is positioned radial outside the portions 18B that are the closest to the central axis Ax of the through-holes 18A. The flange 42 is made from only an elastic material.

In this embodiment, the annular flange 42 of the sealing device 20 is connected to the outer annular part 28 that covers the end surface of the end portion 8A of the outer race 8 and encircles the end portion 8A of the outer race 8. Thus, the flange 42 serves as a foreign-matter-ingress reducing portion that restricts foreign matter from entering over a large area. In FIG. 2, arrow F shows an example of the direction of the flow of foreign matter from the outside. In FIG. 2, arrow F shows an example of the flow direction of foreign matter from the outside. The flange 42 deflects foreign matter coming from the outside and can minimize foreign matter reaching the reaching auxiliary lip 38. The auxiliary lip 38 also deflects foreign matter from the outside, reducing the amount of foreign matter that reaches the side lip 34.

Figure 4:
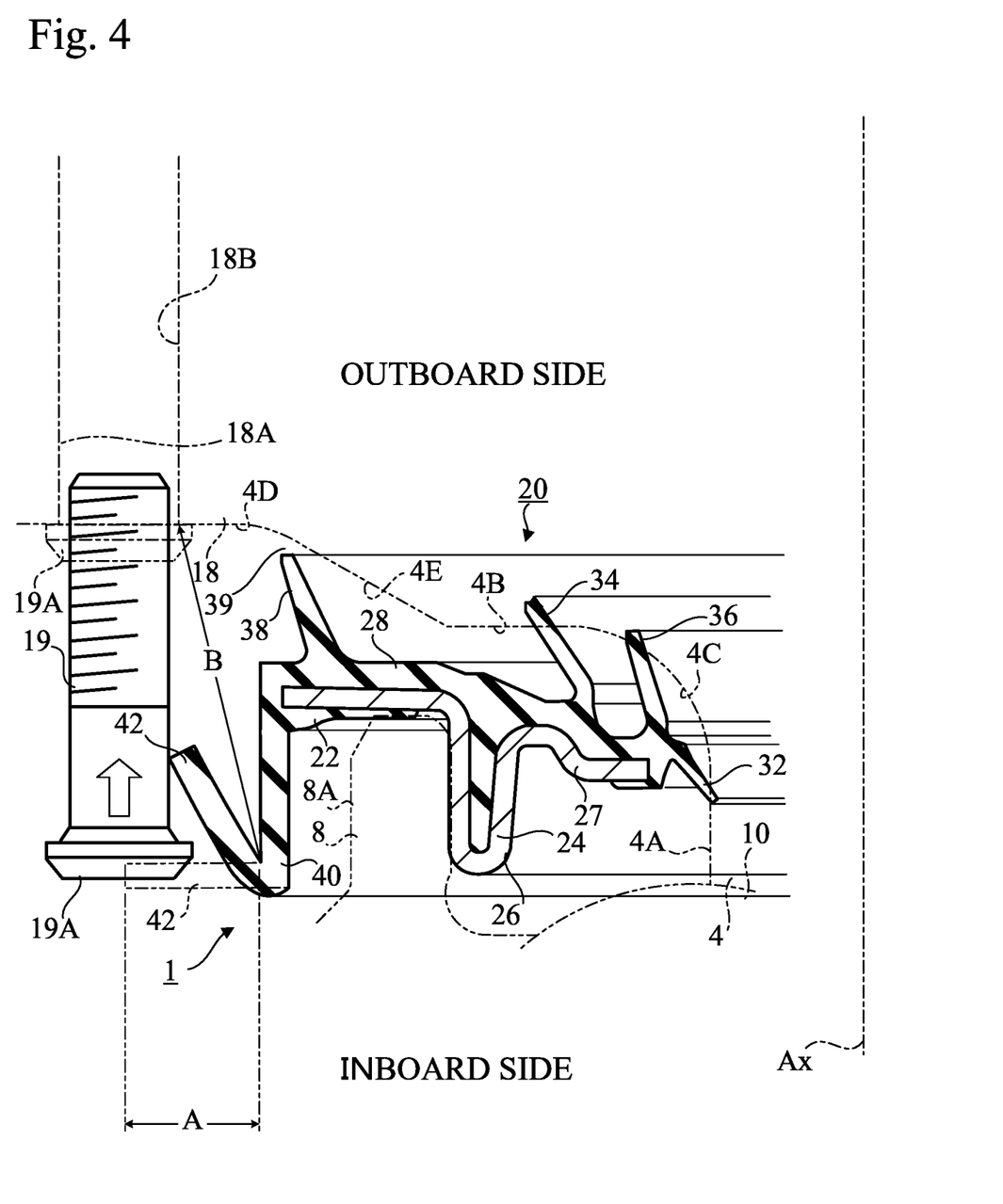
FIG. 4 is a partial cross-sectional view of the sealing device according to the embodiment when a hub bolt is being inserted into a through-hole in a flange of a hub in which the sealing device is used.

As described above, the hub 4 has through-holes 18A into which the hub bolts 19 are inserted for securing the hub 4 to the wheel. FIG. 4 shows a scene when the hub bolts 19 are inserted into the through-holes 18A of the outboard side flange 18 of the hub 4. The outer edge of the flange 42 of the sealing device 20 is located radial outside the portions 18B of the through-holes 18A, which are the closest to the central axis Ax, and the flange 42 has a large dimension. Therefore, when inserting the hub bolts 19 into the through-holes 18A, the hub bolts 19 are passed through the range of the flange 42 of the sealing device 20. Since the flange 42 of the sealing device 20 is formed from an elastic material, when inserting the hub bolts 19 into the through-hole 18A, as shown in FIG. 4, the flange 42 can be elastically deformed (i.e., bent) to facilitate passage of the hub bolts 19 over the flange 42.

Once the hub bolts 19 are in place, as shown in FIG. 2, the flange 42 is returned to the initial shape thereof to restrict the ingress of foreign matter over a large area. Thus, even though there is a space limitation in the structure, the sealing device 20 having the flange 42 as a foreign-matter-ingress reducing portion having a large area can be utilized.

Preferably, the distance A between the outer edge and the inner edge of flange 42 is less than the distance B between the inner edge of flange 42 and the portion 18B of the through-hole 18A, which is the closest to central axis Ax 18B (see FIG. 4). With this feature, when the hub bolts 19 are inserted into the through-holes 18A, the flange 42 is prevented from being caught between the heads 19A of the hub bolts 19 and the outboard side flange 18, and the hub bolts 19 can pass over the flange 42 smoothly. The hub bolts 19 pass the flange 42 while elastically deforming the flange 42, and then the flange 42 is returned to the initial shape thereof by its own elastic restoring force. Since the distance A is less than the distance B, the attachment of the hub bolts 19 can be facilitated.

Figure 5:
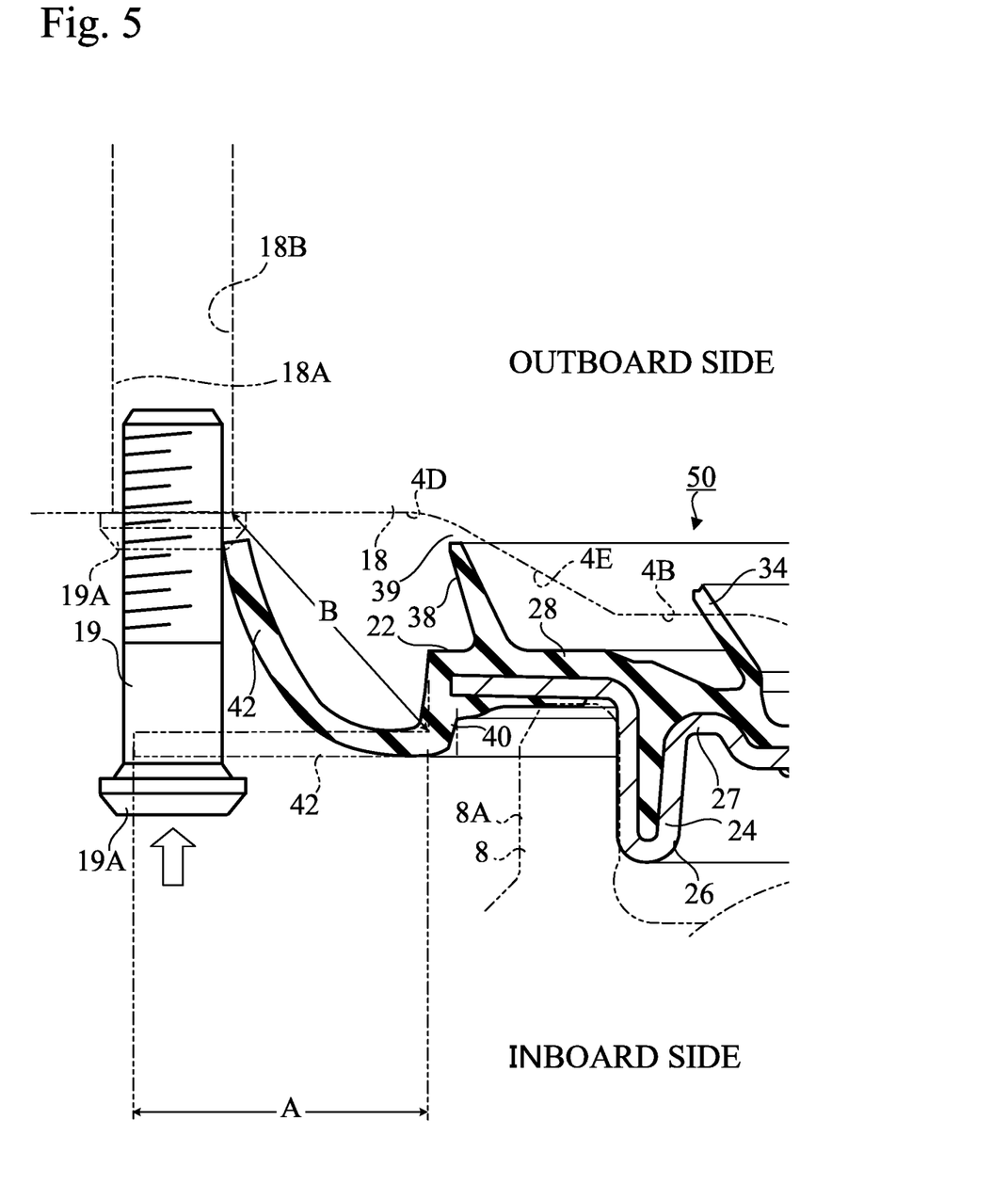
FIG. 5 is a partial cross-sectional view of a sealing device according to a comparative example when a hub bolt is being inserted into a through-hole in a flange of a hub in which the sealing device is used.

FIG. 5 is a cross-sectional view of a sealing device 50 according to a comparative example showing a scene when the hub bolts 19 are inserted into the through-holes 18A of the outboard side flange 18 of the hub 4. In the sealing device 50 according to the comparative example, the distance A between the outer edge and the inner edge of flange 42 is greater than the distance A between the inner edge of flange 42 and the portion 18B of the through-hole 18A that is the closest to central axis Ax. Therefore, when inserting the hub bolts 19 into the through-holes 18A, there is a likelihood that the flange 42 will be caught between the heads 19A of the hub bolts 19 and the outboard side flange 18. To avoid this, the mechanic should deform the flange 42 to move the outer edge of the flange 42 to the inboard side in comparison with the heads 19A of the hub bolts 19. Therefore, the mounting work of the hub bolts 19 does not proceed smoothly.

Figure 6:
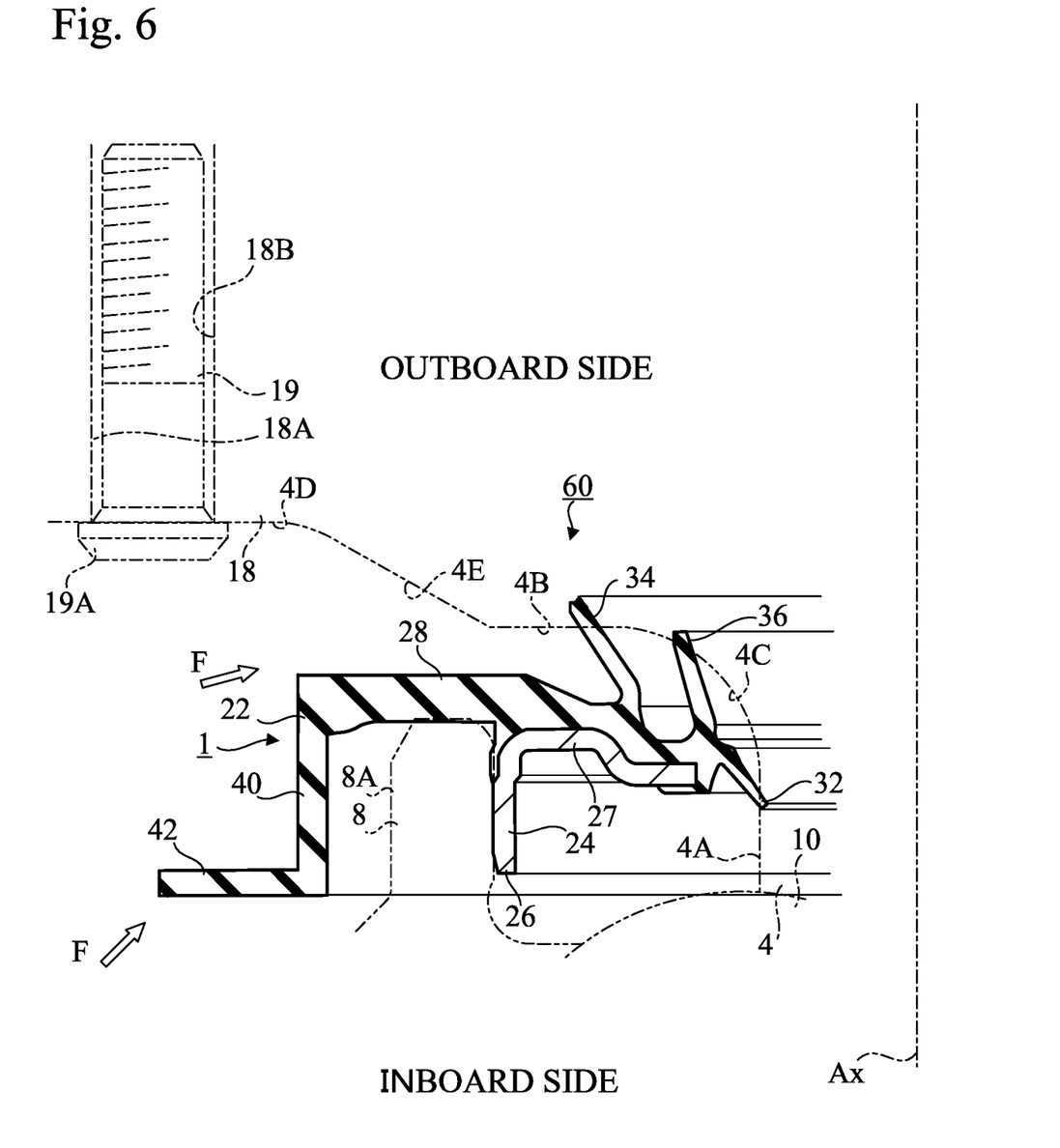
FIG. 6 is a partial cross-sectional view of a sealing device according to a modification of the embodiment.

FIG. 6 is a partial cross-sectional view of a sealing device 60 according to a modification of the embodiment. In FIG. 6 and subsequent drawings, the same reference symbols are used for identifying components that are the same as those in the embodiment, and such components will not be described in detail.

In the sealing device 60, the inner tubular part 26 is constituted almost entirely of the reinforcing ring 24 and is press-fitted into the cylindrical end portion 8A of the outer race 8. A portion of the elastic ring 22 fits between the inner tubular part 26 and the inner peripheral surface of the end portion 8A.

The outer annular part 28 of the sealing device 60 is constituted of only the elastic ring 22.

The sealing device 60 does not have the auxiliary lip 38. However, the flange 42 serves as a foreign-matter-ingress reducing portion that restricts foreign matter from entering over a large area, deflecting foreign matter that arrives from the outside and reducing the amount of foreign matter that reaches the side lip 34.

Figure 7:
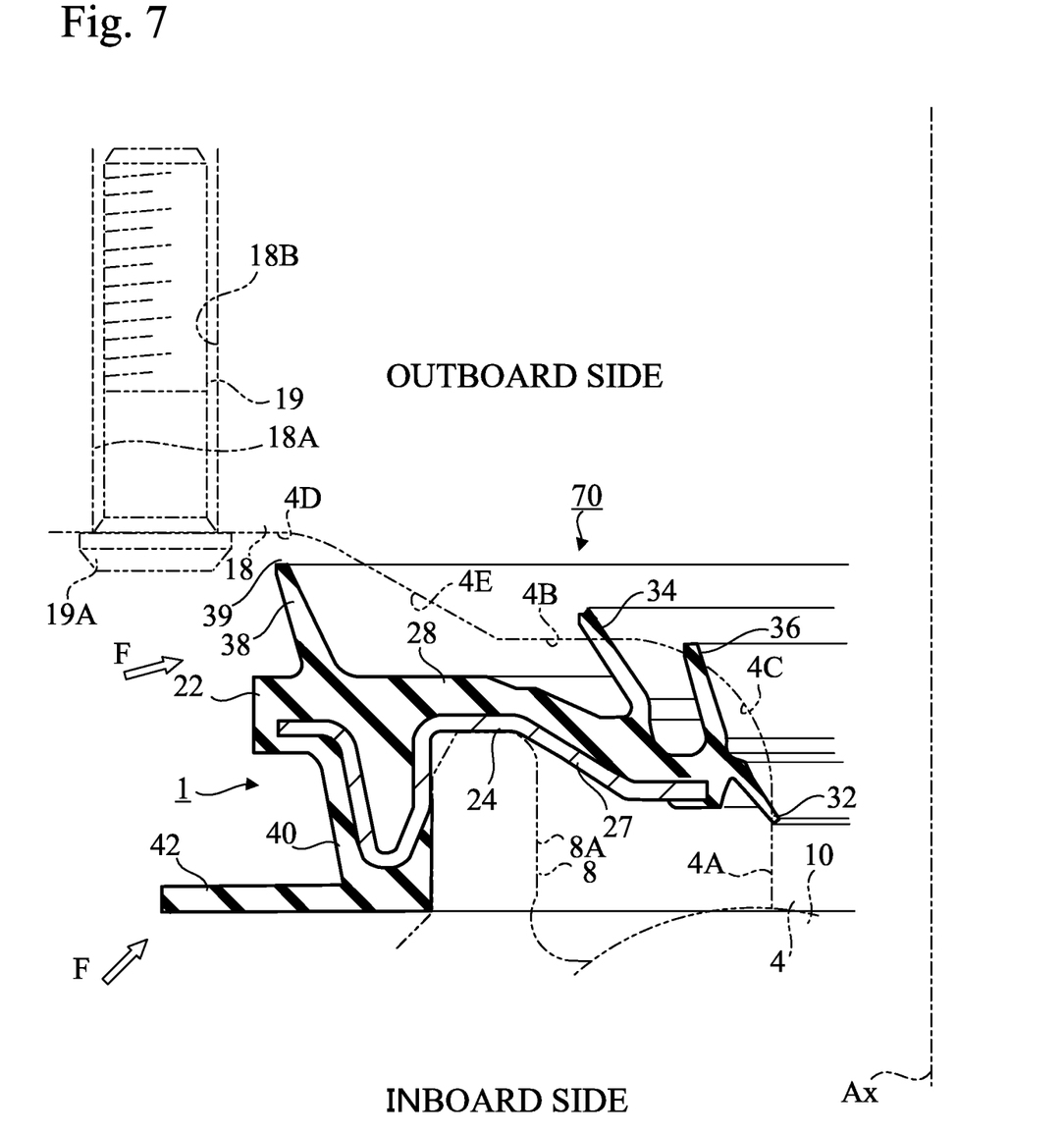
FIG. 7 is a partial cross-sectional view of a sealing device according to another modification of the embodiment.

FIG. 7 shows a sealing device 70 according to another modification of the embodiment.

The sealing device 70 does not have the inner tubular part 26. In this embodiment, the outer tubular part 40 is used for the mounted part. The outer tubular part 40 is a cylindrical part centered on the central axis Ax and attached to the cylindrical end portion 8A of the outer race 8. The outer tubular part 40 is fixed to the end portion 8A. The fixing scheme is not limited, and it may be, for example, an interference fit. The outer tubular part 40 is constituted of tubular portions in which the reinforcing ring 24 is folded and an elastic ring 22 filled in these tubular portions. The inner tubular portion of the tubular portions in which the reinforcing ring 24 is folded has the inner peripheral surface of the outer tubular part 40 that is in close contact with the outer peripheral surface of the end portion 8A by the interference fit.

In the outer annular part 28 of the sealing device 70, the portion of the reinforcing ring 24 is in contact with the end surface of the end portion 8A of the outer race 8.

Figure 8:
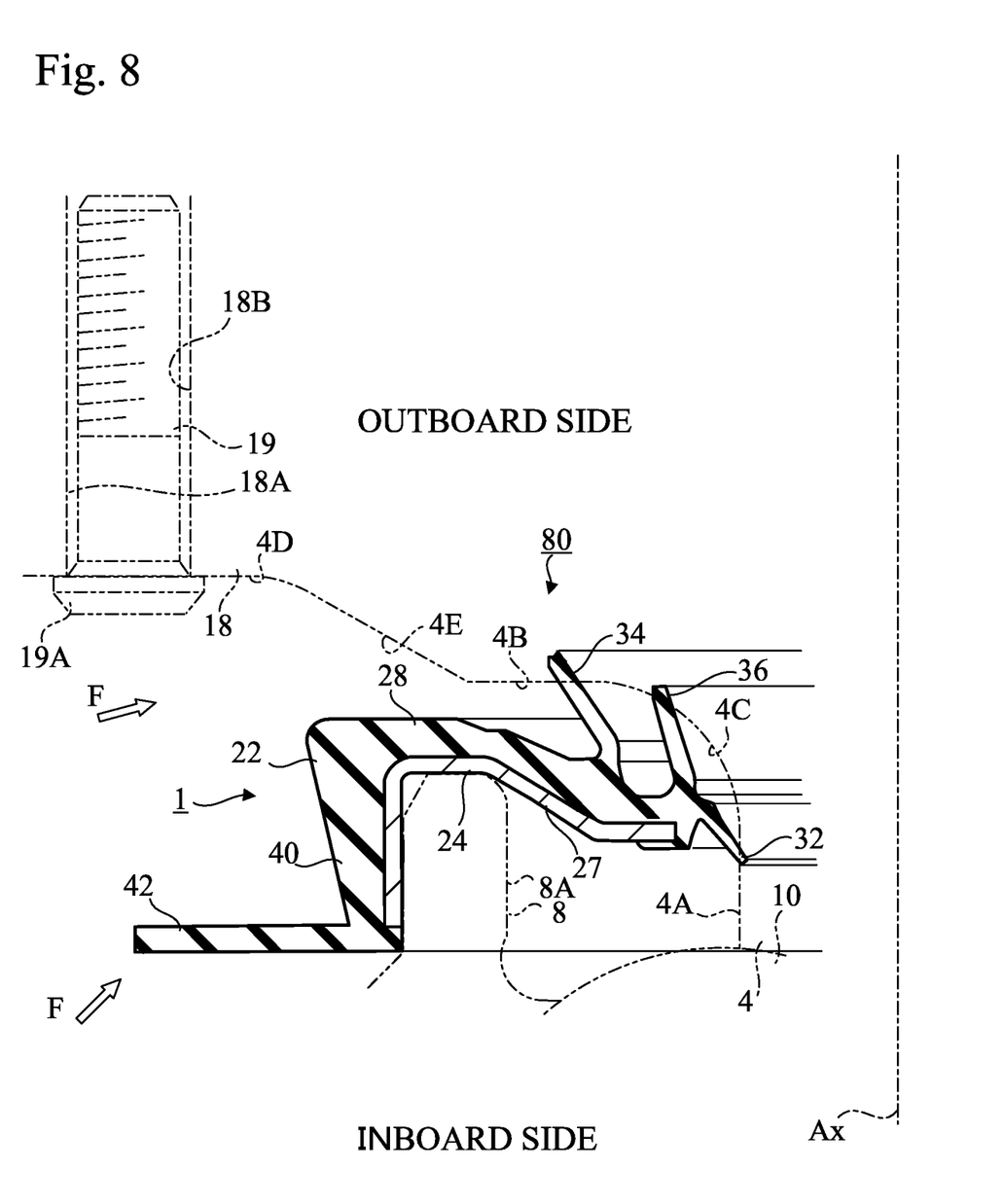
FIG. 8 is a partial cross-sectional view of a sealing device according to another modification of the embodiment.

FIG. 8 shows a sealing device 80 according to another modification of the embodiment.

The sealing device 80 does not have the inner tubular part 26. In this embodiment, the outer tubular part 40 is used for the mounted part. The outer tubular part 40 is a cylindrical part centered on the central axis Ax and attached to the cylindrical end portion 8A of the outer race 8. The outer tubular part 40 is fixed to the end portion 8A. The fixing scheme is not limited, and it may be, for example, an interference fit. The outer tubular part 40 is constituted of a tubular portion of the reinforcing ring 24 and a portion of the elastic ring 22 arranged around the tubular portion. The tubular portion of the reinforcing ring 24 has an inner peripheral surface of the outer tubular part 40, and the outer peripheral surface of the end portion 8A is in close contact with the inner peripheral surface of the outer tubular part 40 by the interference fit.

In the outer annular part 28 of the sealing device 80, the portion of the reinforcing ring 24 is in contact with the end surface of the end portion 8A of the outer race 8.

The sealing device 80 does not have the auxiliary lip 38. However, the flange 42 serves as a foreign-matter-ingress reducing portion that restricts foreign matter from entering over a large area, deflecting foreign matter that arrives from the outside and reducing the amount of foreign matter that reaches the side lip 34.

Figure 9:
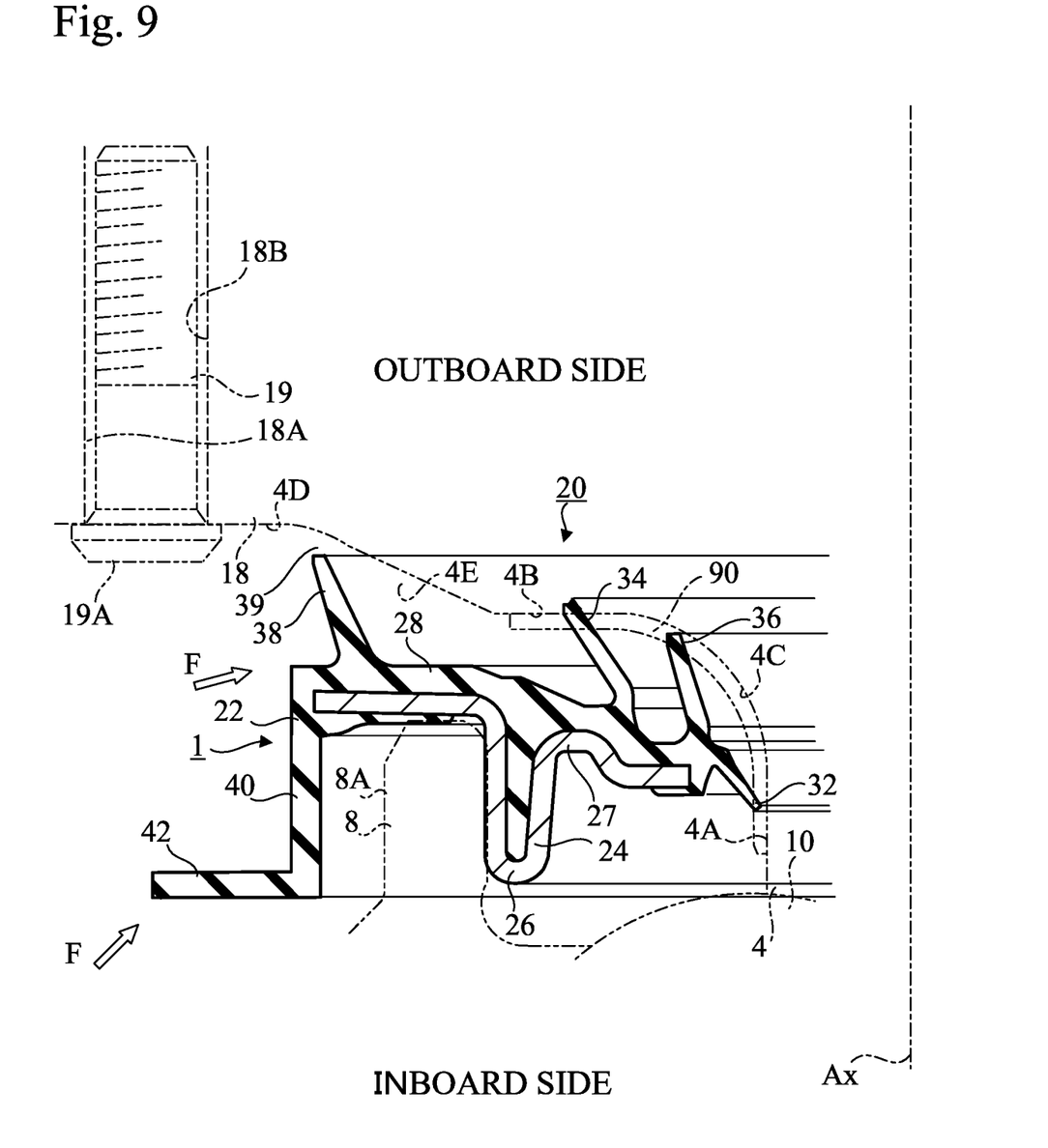
FIG. 9 is a partial cross-sectional view of a sealing device according to another modification of the embodiment.

In the above embodiment and modifications, the lips 32, 34, and 36 are in direct contact with the hub 4. However, as in a modification shown in FIG. 9, a rotational sealing member 90 may be disposed about and fixed to the hub 4 so that the rotational sealing member 90 rotates together with the hub 4, and the lips 32, 34, and 36 may be adapted to be in slidable contact with the rotational sealing member 90. The rotational sealing member 90 is a circular ring centered on the central axis Ax and are made from a rigid material, for example, a metal.

The present invention has been shown and described with reference to preferred embodiments thereof. However, it will be understood by those skilled in the art that various changes in form and detail may be made without departing from the scope of the invention as defined by the claims. Such modifications, alterations, and modifications are intended to be encompassed in the scope of the present invention.

For example, in the above-described embodiment and modifications, the hub 4 and the inner race 6, which are inner members, are rotatable members, while the outer race 8, which is an outer member, is a stationary member. However, the present invention is not limited thereto, and may be configured such that multiple sealed members rotate relative to each other. For example, inner members may be stationary while an outer member may be rotatable, or all of the members may be rotatable.

In the above-described embodiment and modifications, each sealing device is provided with a single reinforcing ring 24. However, each sealing device may include an outer rigid ring and an inner rigid ring that are spaced apart from each other in radial directions.

The use of the present invention is not limited to sealing the hub bearing 1. For example, the sealing device or the sealing structure according to the present invention may be applied to a differential gear mechanism or other power transmission mechanism of an automotive vehicle, to a bearing or other support mechanism for a drive shaft of an automotive vehicle, or to a bearing or other support mechanism of a rotational shaft of a pump.

In the embodiment shown in FIG. 2, the reinforcing ring 24 terminates in the outer annular part 28 and is not provided in the outer tubular part 40. However, the reinforcing ring 24 may be provided in the outer tubular part 40.

The number of lips disposed in the sealing device is not limited to the embodiment and modifications.

REFERENCE SYMBOLS

1: Hub bearing
Ax: Central axis

4: Hub (inner member)
6: inner race (inner member)
8: outer race (outer member)
8A: End portion
18: Outboard side flange
18A: Through-hole
18B: Portion of the through-hole that is the closest to central axis
19: Hub bolt (screw)
20, 60, 70, 80: Sealing device
22: Elastic ring
24: Reinforcing ring
26: Inner tubular part (mounted part)
27: Inner annular part
28: Outer annular part
32: Radial lip
34, 36: Side lip
40: Outer tubular part (mounted part)
42: Flange

The invention claimed is:

1. A sealing structure comprising:

an inner member;

an outer member rotating relative to the inner member; and a sealing device located between the inner member and the outer member for sealing a gap between the inner member and the outer member, the sealing device comprising:

a mounted part comprising a central axis and adapted to be attached to a cylindrical end portion of the outer member;

at least one lip disposed radial inside the mounted part and adapted to extend toward the inner member;

an annular part covering an end surface of the end portion of the outer member; and a first annular flange formed from an elastic material connected to the annular part and disposed radial outside the end portion of the outer member, the inner member comprising:

an inner portion disposed radial inside the outer member;

a second flange extending radially outward from the inner portion;

a screw for securing the inner member to another member; and a through-hole formed in the second flange of the inner member into which the screw is inserted, wherein the screw is inserted into the through-hole such that a head of the screw is located closer to the sealing device in a direction along the central axis, and an outer edge of the first annular flange of the sealing device is disposed radial outside a portion of the through-hole that is closest to the central axis.

2. The sealing structure according to claim 1, wherein a distance between the outer edge and an inner edge of the first annular flange of the sealing device is less than a distance between the inner edge and the portion of the through-hole that is closest to the central axis.

* * * * *